T. D. BUDD.
GRAIN CAR HANDLING APPARATUS.
APPLICATION FILED APR. 3, 1918.
1,378,089.
Patented May 17, 1921.
2 SHEETS—SHEET 1.
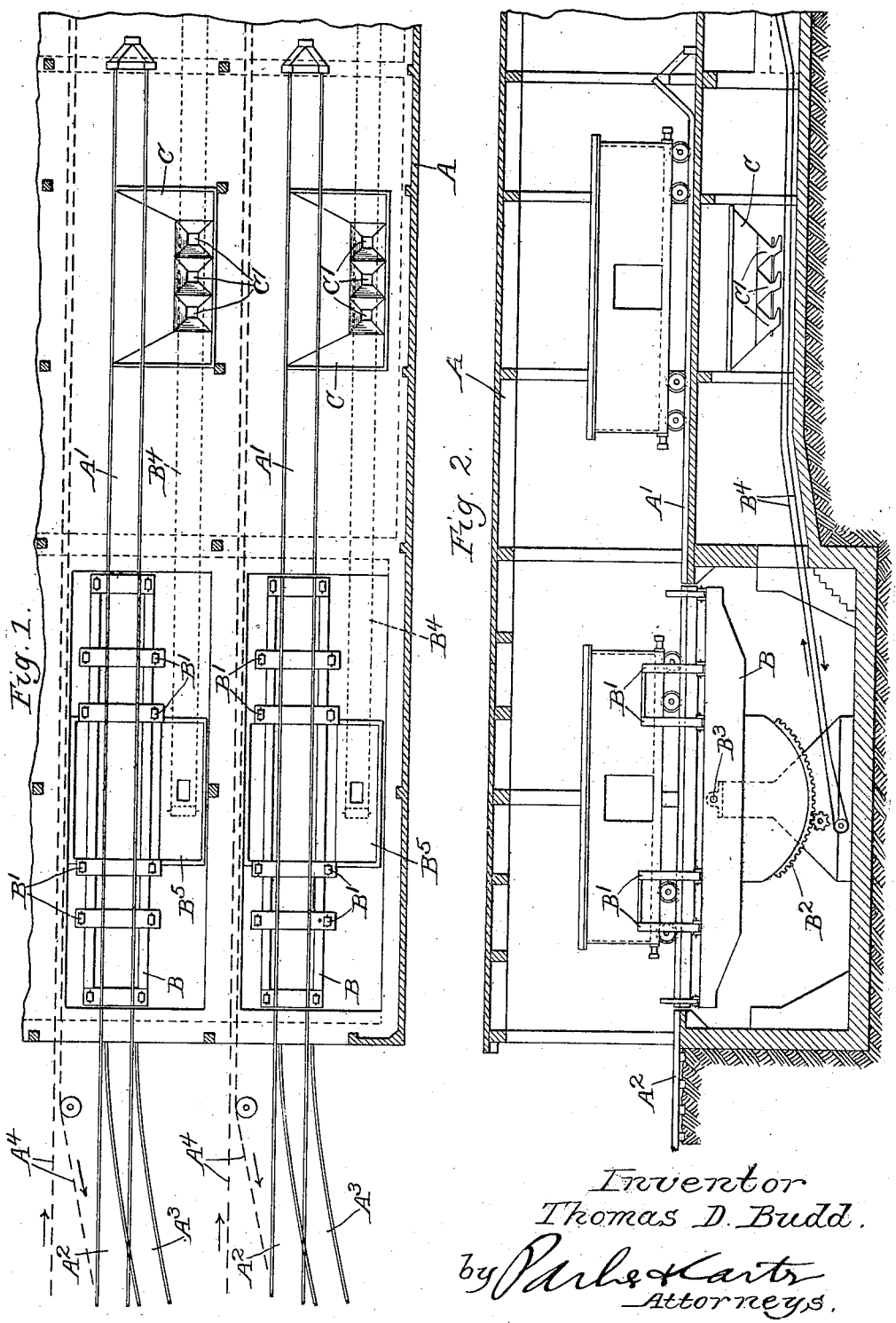
Inventor
Thomas D. Budd.
by Parker & Carter
Attorneys.

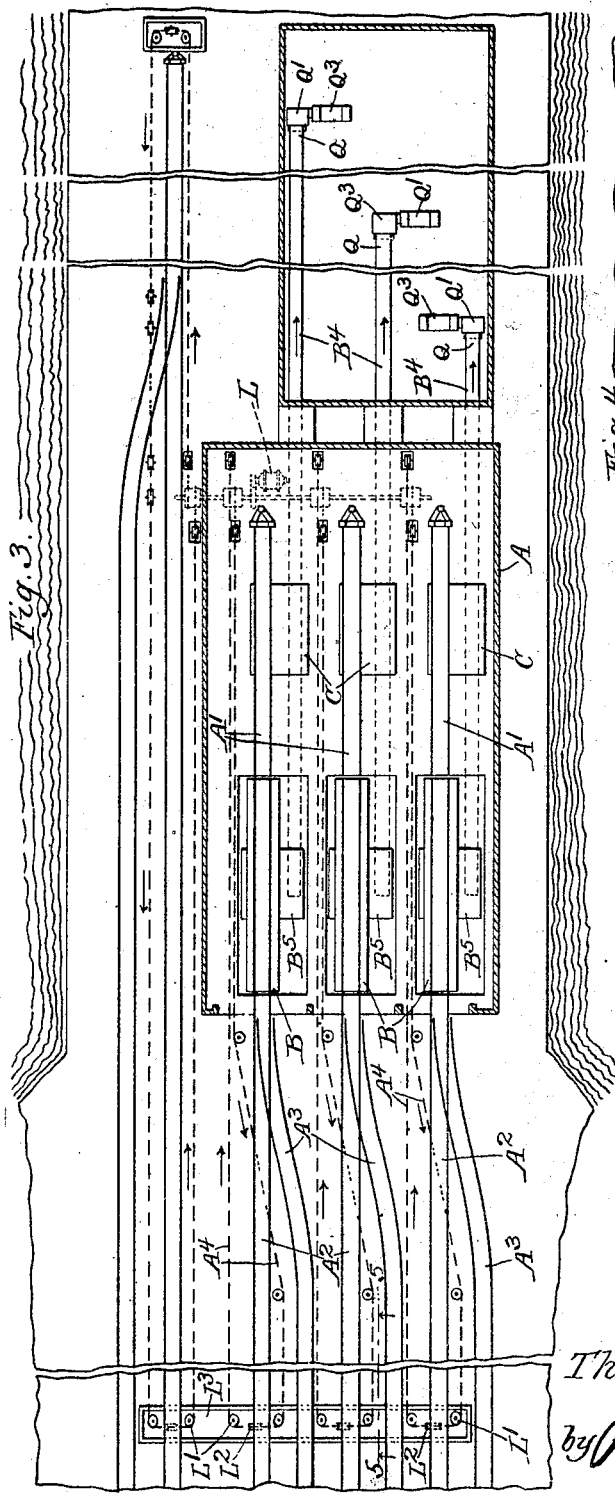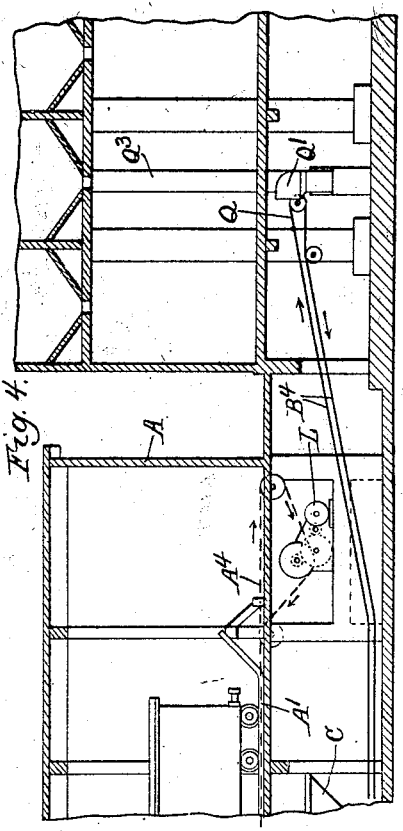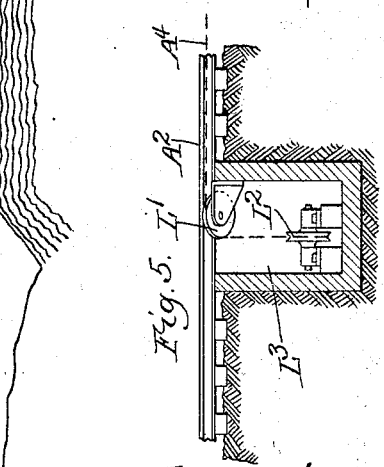

UNITED STATES PATENT OFFICE.

THOMAS D. BUDD, OF CHICAGO, ILLINOIS, ASSIGNOR OF ONE-HALF TO LINK-BELT COMPANY, OF CHICAGO, ILLINOIS, A CORPORATION OF ILLINOIS, AND ONE-HALF TO JAMES STEWART & COMPANY, INC., OF NEW YORK, N. Y., A CORPORATION OF NEW YORK.

GRAIN-CAR-HANDLING APPARATUS.

1,378,089.

Specification of Letters Patent.

Patented May 17, 1921.

Application filed April 3, 1918. Serial No. 226,534.

*To all whom it may concern:*

Be it known that I, THOMAS D. BUDD, a citizen of the United States, residing at Chicago, in the county of Cook and State of Illinois, have invented a certain new and useful Improvement in Grain-Car-Handling Apparatus, of which the following is a specification.

My invention relates to improvements in grain car handling apparatus and has for one object to provide an apparatus whereby the unloading of cars in such place as an elevator may be expedited and whereby the delay caused by a so-called slow car may be minimized. Other objects will appear from time to time in the specification.

In unloading grain from cars in elevators and the like, it is customary to have a plurality of tracks with the handling house intermediate the ends of the track and with a plurality of receiving hoppers along each track. Means are provided for taking the grain from the hopper and transporting it into the working house. The loaded cars are run onto these tracks filling the track from one end down to the receiving hoppers, there being a car spotted over each receiving hopper. The men then go into the car and unload each car by hand, discharging in the appropriate receiving hopper. Ordinarily there would be from two to seven hoppers on each track or even more or less on each track. As soon as all the cars in one group on one track have been unloaded and until all of them have been unloaded the whole string is moved along to spot another group of loaded cars over the receiving hoppers. These cars are unloaded and then another group spotted. Since you have a plurality of cars being unloaded simultaneously and since the grain is going to different points in the working house there is great possibility of a break down or delay at some one of the receiving hoppers. This ties up all the other cars in the group and the cars in the string because you can not move any of the cars out until all of them have been in their turn unloaded.

Many different causes of delay prevail. For instance, you might have a so-called bulk head car wherein two or three different batches of grain are separated by bulk heads and the identity of the grain must be preserved. This requires special handling and manipulation of the grain handling mechanism and of course, all the other cars in the string must wait until this bulk headed car has been attended to. Also cars may break down. It may not be possible to move them properly or there may be something wrong with the grain so the car does not unload easily or something may go wrong in the house and in fact an innumerable number of possibilities of delay are constantly present and any delay at any one car ties up all the other cars in the string. Of course, as you increase the capacity of the cars and the number of grain handling legs and receiving hoppers you increase the loss caused by the delay of any one car.

Moreover, you need twice as much track as you have cars. That is to say, you have at one side of the house the track upon which the loaded cars are run and at the other side of the house the track upon which the empty cars may stand and it takes a very long piece of property to carry sufficient trackage to give you enough capacity for rapid handling. This kind of property is very expensive and thus the cost of erecting and running an elevator becomes very large.

When a string of loaded cars has been run into the storage track the whole string must be moved as a unit across the unloading zone where the receiving hoppers are located and until all the loaded cars have been unloaded and the track for the storage of the empty cars has been filled, no further addition of loaded cars to the system and no withdrawal of loaded cars from the system can be made, so that much time is wasted in waiting for the switch engine to come and take away the empties and replace them by a string of loaded cars and the operation cannot be continuous and must be intermittent.

I propose, therefore, to provide such an arrangement of trackage and such means for unloading the cars as will make it possible either to use a shorter piece of property or to use substantially all the property except the ground actually occupied by the elevator and house for the storage of cars. I also propose to provide an arrangement whereby a single slow car, no matter why it is slow, will not delay the continuous operation of the system. Moreover, I provide an arrangement whereby the unloading, so far as my arrangement and process is concerned, is a continuous process. You do not have to wait for the switch engine and you will always have enough loaded cars in storage to keep the house running full blast all the time, provided, of course, the railroad is able to supply them and it is possible for the switch engine to set in loaded cars, take out the empties from time to time and replenish the reservoir of loaded cars and reduce the supply of empties in storage without effecting in any way the operation of the house and the carrying of my unloading and grain handling system.

Obviously, of course, this same system can be applied to loading up cars and while I have illustrated it as applied to unloading and incoming car arrangement, the showing is purely diagrammatic and I have not illustrated specific means for loading or unloading cars. If you were loading cars, you would do the same thing, only the railroad would send in empties and take out the loaded cars.

If you were sending out loaded cars, you would load them with the cars standing just exactly where they stand for unloading, though frequently, as suggested, you would provide a separate track, but if a very large number of empties are being loaded an additional number of tracks might be used and the track used for unloading would be used for loading.

By my arrangement, therefore, I provide pairs or groups of parallel or adjacent tracks, one for the loaded cars, the other for the unloaded cars. These tracks join at their inner end and terminate in a track which leads to what I have called a dumping zone or area, though it might be a loading zone or area and successive cars are fed in from the loaded track to the dumping zone or area where they are unloaded and then the cars are fed out to the empty track. This is a continuous process. The switch engine adds more loaded cars and takes away the empties. The haulage system moves the cars into the dumping or unloading area and out from the dumping or unloading area.

The terms "unloading zone" and "handling zone" are synonymous. You handle the grain; you load it into the car or you unload it from the car or from the elevator into the car. The point is you move up a car and either load or unload grain into it and then you move the car out and it is taken away.

By my arrangement, therefore, with the dumping at the end of the track and with an incoming and outgoing track joining at the dump, I am able to carry on a continuous unloading process. All the switch engine has to do is place more loaded cars on each incoming track and take the empties from the outgoing track. My hauling cable moves the loaded cars in and the empties out and the dumping process can be continuous while the switching process is intermittent owing to the fact that there is always a reservoir or supply of cars waiting to be unloaded. This arrangement, therefore, cuts the length of the plot of land upon which the tracks must be laid in half and effects a great saving because one of the greatest expenses in connection with elevators is the amount of land for trackage and the very large amount of vacant space which must be taken because the trackage needs length and not width except at the point where the elevator and working house and the track are side by side. In other words, the total width of the plot of ground under the old system depends on the width of track plus the width of the elevator; whereas with my arrangement and process the total ground area may be used for trackage except where it is actually occupied by the house and there is substantially no waste ground space.

My invention, therefore, relates specifically to a particular mechanism and apparatus for carrying out the above discussed process and for accomplishing the purposes above suggested or indicated.

The invention is illustrated more or less in the accompanying drawings, wherein—

Figure 1 is a plan view;

Fig. 2 is a side elevation;

Fig. 3 is a plan view of an elevator working housing and track arrangement;

Fig. 4 is a section through a part of the housing and dumping shed;

Fig. 5 is a section along the line 5—5 of Fig. 1.

Like parts are indicated by like characters in all the figures.

A is a receiving shed of an elevator. It contains the unloading track $A^1$ extending throughout its entire length. This track communicates with an ingoing track $A^2$ and an outgoing track $A^3$ whereby cars may be drawn on the unloading track and then sent out along the outgoing track by means of hauling cables $A^4$ driven from any suitable source of power not here specifically illustrated.

The unloading track passes over a car tipple B of ordinary type comprising a bridge, locking means $B^1$ whereby the car may be locked to the bridge, and a quadrant $B^2$ whereby the tipple may be rotated about an axle $B^3$ to dump the car. $B^4$ is a receiving belt which receives grain from the hopper $B^5$ into which it is discharged from the car door. This grain is carried away by the receiving belt and disposed of in any suitable way not here illustrated.

The track A¹ extending beyond the tipple terminates in a section overlying a receiving pit C where hand dumping may take place, that is, in the bottom of the pit where a plurality of discharge hoppers C¹ are closed at their bottom arranged to discharge on to the belt B⁴. The arrangement is such that cars may be drawn in on the tipple spotted thereon, locked in position, dumped by tipping, and then sent out, leaving a place for the next car to come in. If a slow car comes in which cannot be dumped, it is carried on through and spotted over the receiving pit. The hopper doors are left closed and the grain is dumped into the pit. When the job has been done and the operator wishes to dispose of the grain in the receiving pit he waits until there is no flow of grain along the belt from the tipple and then he opens the hopper doors, permits the grain to run in on the receiving belt, and it is carried on in the usual manner.

I have shown diagrammatically a haulage system wherein the hauling cable A⁴ is driven by a motor L at the discharge end of the line. This cable passes down parallel with the tracks being so arranged that it moves in along the incoming tracks and out along the outgoing tracks. The bight of the cable passes over the sheaves L¹ adjacent the track and anchor pulleys L² into the pit L³. This is just one way of arranging the cable and the hauling cable might be arranged in any suitable manner. The cars are hauled by the cable by means of clutches which may be clamped on the cable by the operator. These are of any suitable type and I have not illustrated them because they may be bought in any market of many different makes and form no part of my invention. It will be understood that there is a slight downward incline from the working house so that the cars will run by gravity to then switch from the incoming to the outgoing track. This makes it possible for the cable to pass under the incoming track, the car being hooked on only after it has moved over.

Attention is called to the conveyer belt B⁴. Owing to the fact that it extends longitudinally of the tracks and not across, then its upper discharge end can be as high as might be desired. As shown in Fig. 4, the upper discharge end of the cable at Q is away above the bottom of the hopper C. It there discharges into a discharge hopper Q¹ and thence supplies the boot Q³. This apparatus is very much higher than the bottom of the dump hopper and thus there is no need for deep excavation to get the end of the boot below the discharge point of the belt conveyer.

I have shown in my drawings one arrangement which would carry out my process, but clearly many suitable different arrangements might be arrived at which would equally well solve the problem of rapidly dumping the fast train and still making it possible to dump the slow cars without interfering with the fast cars, and I wish therefore that my drawings be regarded as in a very important sense diagrammatic, even though they do happen to exemplify an operative structure.

I claim:

1. A grain handling apparatus comprising a track for the storage of loaded cars, a track for the storage of unloaded cars, said tracks being joined at one end, a single unloading track connected to the pair where they join, the tracks for the loaded and for the unloaded cars extending in the same general direction, a car dumping cradle and a hand unloading pit arranged along the unloading track.

2. A grain handling apparatus comprising a track for the storage of loaded cars, a track for the storage of unloaded cars, said tracks being joined at one end, a single unloading track connected to the pair where they join, the tracks for the loaded and for the unloaded cars extending in the same general direction, and a car dumping cradle and a hand unloading pit arranged along the unloading track, the car dumping cradle being nearer to the junction of the two tracks of the pair than the hand unloading pit.

3. A grain handling apparatus comprising a track for the storage of inbound cars, a track for the storage of outbound cars, the inbound and the outbound tracks being joined together, the handling track communicating with the tracks where they join, a dumping cradle adapted to dump the car, means for conveying the grain thus dumped away from the cradle, and a hand unloading pit arranged beyond the dumping cradle.

4. A material handling apparatus comprising a track for the storage of loaded cars, a track for the storage of unloaded cars, said tracks being joined at one end, a single unloading track connected to the pair where they join, a plurality of unloading means arranged along each such unloading track.

5. A material handling apparatus comprising a track for the storage of loaded cars, a track for the storage of unloaded cars, said tracks being joined at one end, a single unloading track connected to the pair where they join, a plurality of unloading means arranged along each such unloading track, adapted for separate and simultaneous unloading.

6. A material handling apparatus comprising a track for the storage of loaded cars, a track for the storage of unloaded cars, said tracks being joined at one end, a single handling track connected to the pair where they join, a plurality of handling means arranged along each such handling track.

7. A material handling apparatus comprising a track for the storage of loaded cars, a track for the storage of unloaded cars, said tracks being joined at one end, a single handling track connected to the pair where they join, a plurality of handling means arranged along each such handling track, adapted for separate and simultaneous handling.

8. A material handling apparatus comprising a plurality of tracks for the storage of loaded cars, a plurality of tracks for the storage of unloaded cars, said tracks being arranged in pairs joined at one end, a single unloading track connected to each pair where they join, a plurality of material receiving means arranged along each such unloading track a single material conveying means adapted to carry off the discharge of all such unloading means.

9. In a material handling unit comprising a pair of substantially parallel tracks joined at one end, a material handling track connected to such pair where they join, material handling means on the handling track, adjacent such junction, and separate auxiliary material receiving means on said track beyond said junction.

10. In an unbroken car handling circuit, means for handling the loaded cars intermediate the ends of the circuit and means adjacent the handling means for cutting cars out of the circuit for separate handling adapted to return the cars into the circuit without breaking it.

11. In an unbroken car handling circuit, means for handling the loaded cars intermediate the ends of the circuit and means adjacent the handling means for cutting cars out of the circuit for separate simultaneous handling adapted to return the cars into the circuit without breaking it.

12. A material handling unit comprising a track for the movement of loaded cars, a track for the movement of unloaded cars, said tracks joined at one end, an unloading track connected to said tracks, where they join, a car dumping means, on the unloading track, adjacent its junction with the other tracks, and an alternate car unloading means on the unloading track beyond the first dumping means, but adjacent to it.

13. A material handling unit comprising a track for the movement of loaded cars, a track for the movement of unloaded cars, said tracks joined at one end, an unloading track connected to said tracks where they join, a car dumping means, on the unloading track, adjacent its junction with the other tracks, an alternate unloading station on the unloading track beyond the car dumping means, but adjacent it.

In testimony whereof, I affix my signature in the presence of two witnesses this 29th day of March, 1918.

THOMAS D. BUDD.

Witnesses:
F. L. HAGUE,
C. A. MONEY.